United States Patent
Karlsson et al.

(10) Patent No.: US 10,350,832 B2
(45) Date of Patent: Jul. 16, 2019

(54) SIMPLIFIED TRANSVERSAL INDUCTION SEALING DEVICE

(71) Applicant: Tetra Laval Holdings & Finance S.A., Pully (CH)

(72) Inventors: Per Karlsson, Malmö (SE); Marko Stajkovic, Malmö (SE); Louis Carlioz, Arlöv (SE); Håkan Andersson, Åkarp (SE); Patrik Ingvarsson, Kristianstad (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 2 days.

(21) Appl. No.: 15/529,340

(22) PCT Filed: Nov. 18, 2015

(86) PCT No.: PCT/EP2015/076983
§ 371 (c)(1),
(2) Date: May 24, 2017

(87) PCT Pub. No.: WO2016/083212
PCT Pub. Date: Jun. 2, 2016

(65) Prior Publication Data
US 2017/0274582 A1    Sep. 28, 2017

(30) Foreign Application Priority Data
Nov. 25, 2014   (SE) ........................................ 1451414

(51) Int. Cl.
*B29C 65/00*    (2006.01)
*B29C 65/36*    (2006.01)
(Continued)

(52) U.S. Cl.
CPC ............ *B29C 66/8122* (2013.01); *A23L 3/10* (2013.01); *B29C 65/32* (2013.01); *B29C 65/368* (2013.01);
(Continued)

(58) Field of Classification Search
CPC ............ B29C 66/8122; B29C 66/1122; B29C 66/323; B29C 66/4312; B29C 66/72321;
(Continued)

(56) References Cited

U.S. PATENT DOCUMENTS 3,808,074 A *  4/1974  Smith ................. B21D 5/0209
                                                       156/272.4
3,864,186 A     2/1975  Balla
(Continued)

FOREIGN PATENT DOCUMENTS

CN         1688483 A     10/2005
CN       102181156 A      9/2011
(Continued)

OTHER PUBLICATIONS

Machine Translation of JP-57148619-A (Year: 1982).*
(Continued)

*Primary Examiner* — Daniel McNally
(74) *Attorney, Agent, or Firm* — Knobbe, Martens, Olson & Bear LLP

(57) ABSTRACT

Disclosed embodiments relate to an induction sealing device for heat sealing packaging material for producing sealed packages of pourable food products. In some embodiments, the sealing device includes: an inductor device which interacts with said packaging material by means of at least one active surface; a flux-concentrating insert; and a supporting body made of heat-conducting material and housing said inductor device and said flux-concentrating insert, wherein said flux concentrating insert is made by a magnetic com-
(Continued)

pound of a polymer and soft magnetic particles; and said flux concentrating insert interacts with said packaging material via at least one interactive surface.

22 Claims, 4 Drawing Sheets

(51) Int. Cl.
 B65B 51/22 (2006.01)
 B29C 65/74 (2006.01)
 A23L 3/10 (2006.01)
 B29C 65/32 (2006.01)
 B29K 705/02 (2006.01)
 B29L 31/26 (2006.01)
(52) U.S. Cl.
 CPC ...... *B29C 65/3656* (2013.01); *B29C 65/3668* (2013.01); *B29C 65/74* (2013.01); *B29C 66/1122* (2013.01); *B29C 66/232* (2013.01); *B29C 66/4312* (2013.01); *B29C 66/72321* (2013.01); *B29C 66/8126* (2013.01); *B29C 66/81261* (2013.01); *B29C 66/81427* (2013.01); *B29C 66/849* (2013.01); *B65B 51/227* (2013.01); *A23V 2002/00* (2013.01); *B29C 66/71* (2013.01); *B29C 66/72328* (2013.01); *B29C 66/81419* (2013.01); *B29K 2705/02* (2013.01); *B29K 2995/0008* (2013.01); *B29L 2031/26* (2013.01)
(58) Field of Classification Search
 CPC .......... B29C 66/8126; B29C 66/81261; B29C 66/81427; B29C 66/849; B29C 65/32; B29C 65/3656; B29C 65/3668; B29C 65/368; B29C 65/74; B65B 51/227
 See application file for complete search history.

(56) References Cited

U.S. PATENT DOCUMENTS

| | | | | |
|---|---|---|---|---|
| 4,169,004 | A | * | 9/1979 | Kock ................. A61F 13/2082 156/227 |
| 4,704,509 | A | | 11/1987 | Hilmersson et al. |
| 4,757,175 | A | | 7/1988 | Mohr et al. |
| 4,776,980 | A | | 10/1988 | Ruffini |
| 4,808,326 | A | | 2/1989 | Tanino et al. |
| 5,250,140 | A | | 10/1993 | Hayashi et al. |
| 5,418,069 | A | | 5/1995 | Learman |
| 5,418,811 | A | | 5/1995 | Ruffini et al. |
| 5,588,019 | A | | 12/1996 | Ruffini et al. |
| 5,714,033 | A | | 2/1998 | Hayashi et al. |
| 5,889,263 | A | | 3/1999 | Andersson |
| 6,167,681 | B1 | * | 1/2001 | Yano ................. B29C 65/3656 53/373.7 |
| 6,837,025 | B2 | | 1/2005 | Kume |
| 2002/0108705 | A1 | | 8/2002 | Kume et al. |
| 2006/0154052 | A1 | * | 7/2006 | Waffenschmidt .... H05K 1/0373 428/339 |
| 2010/0025391 | A1 | | 2/2010 | Palombini et al. |
| 2010/0155390 | A1 | | 6/2010 | Hirota |
| 2010/0180545 | A1 | | 7/2010 | Palmquist et al. |
| 2011/0094672 | A1 | | 4/2011 | Wijk et al. |
| 2013/0263556 | A1 | * | 10/2013 | Babini ................ B29C 65/3656 53/370.7 |

FOREIGN PATENT DOCUMENTS

| | | | |
|---|---|---|---|
| EP | 0 225 392 A1 | 6/1987 | |
| EP | 0484998 A1 | 5/1992 | |
| EP | 0 653 899 A2 | 5/1995 | |
| EP | 0730946 A2 | 9/1996 | |
| EP | 0796718 A1 | 9/1997 | |
| EP | 1231149 A1 | 8/2002 | |
| EP | 1234771 A1 | 8/2002 | |
| EP | 1 270 182 A1 | 1/2003 | |
| EP | 1 270 182 B1 | 6/2008 | |
| EP | 2 008 795 A1 | 12/2008 | |
| EP | 2008795 B1 | 8/2011 | |
| EP | 2 781 325 A1 | 9/2014 | |
| FR | 2 073 137 A5 | 9/1971 | |
| JP | 57148619 A | * 9/1982 | ......... B29C 65/3656 |
| JP | S57 148619 A | 9/1982 | |
| JP | S63-187591 A | 8/1988 | |
| JP | S63-258729 A | 10/1988 | |
| JP | H04-154564 A | 5/1992 | |
| JP | H08-244728 A | 9/1996 | |
| SE | 434240 B | 7/1984 | |
| WO | WO 01/085827 | 11/2001 | |
| WO | WO 03/097332 A1 | 11/2003 | |
| WO | WO 2015/158502 A1 | 10/2015 | |

OTHER PUBLICATIONS

International Search Report and Written Opinion for PCT/EP2015/076983 dated Feb. 15, 2016 in 12 pages.
International-type Search Report for Swedish National Application No. 1451414-5 dated May 29, 2015 in 6 pages.
International Search Report (PCT/ISA/210) dated Aug. 6, 2015, by the European Patent Office as the International Searching Authority for International Application No. PCT/EP2015/056173.
Leschynsky et al "Layered Alloys for Effective Magnetic Flux Concentration in Induction Heating," Materials Science—Poland, vol. 25, No. 2, 2007.
Office Action in Japanese Application No. 2016-562918, dated Mar. 5, 2019.
Written Opinion (PCT/ISA/237) dated Aug. 6, 2015, by the European Patent Office as the International Searching Authority for International Application No. PCT/EP2015/056173.

* cited by examiner

SIMPLIFIED TRANSVERSAL INDUCTION SEALING DEVICE

TECHNICAL FIELD

The present invention relates to an induction sealing device for heat sealing packaging material for producing sealed packages of pourable food products. More particular, the invention relates to an induction sealing device according to the introductory parts of claim 1.

BACKGROUND OF THE INVENTION

Many pourable food products, such as fruit juice, UHT milk, wine, tomato sauce, etc., are sold in packages made of sterilized packaging material.

A typical example of this type of package is the parallelepiped-shaped package for liquid or pourable food products known as Tetra Brik Aseptic (registered trademark), which is made by folding and sealing laminated strip packaging material.

The packaging material has a multilayer structure substantially comprising a base layer for stiffness and strength, which may comprise a layer of fibrous material, e.g. paper, or mineral-filled polypropylene material; and a number of layers of heat-seal plastic material, e.g. polyethylene films, covering both sides of the base layer.

In the case of aseptic packages for long-storage products, such as UHT milk, the packaging material also comprises a layer of gas- and light-barrier material, e.g. aluminium foil or ethyl vinyl alcohol (EVOH) film, which is superimposed on a layer of heat-seal plastic material, and is in turn covered with another layer of heat-seal plastic material forming the inner face of the package eventually contacting the food product.

As is known, packages of this sort are produced on fully automatic packaging units, on which a continuous tube is formed from the web-fed packaging material; the web of packaging material is sterilized on the packaging unit, e.g. by applying a chemical sterilizing agent, such as a hydrogen peroxide solution, which, once sterilization is completed, is removed from the surfaces of the packaging material, e.g. evaporated by heating; and the web of packaging material so sterilized is maintained in a closed, sterile environment, and is folded and sealed longitudinally to form a vertical tube.

The tube is fed continuously in a first vertical direction, is filled with the sterilized or sterile-processed food product, and is gripped at equally spaced cross sections by two pairs of jaws. More specifically, the two pairs of jaws act cyclically and successively on the tube, and heat seal the packaging material of the tube to form a continuous strip of pillow packs connected to one another by respective transverse sealing bands, i.e. extending in a second direction perpendicular to said first direction.

The pillow packs are separated by cutting the relative transverse sealing bands, and are then fed to a final folding station where they are folded mechanically into the finished parallelepiped shape.

The tube portion gripped between each pair of jaws is heat sealed by heating means fitted to one of the jaws, known as the sealing jaw, and which locally melt the two layers of heat-seal plastic material gripped between the jaws.

More specifically, packaging material in which the layer of barrier material comprises a sheet of electrically conductive material, e.g. aluminium, is normally heat sealed by a so-called induction heat-sealing process, in which, when the tube is gripped by the two jaws, loss current is induced in, and locally heats, the aluminium sheet, thus melting the heat-seal plastic material locally.

More specifically, in induction heat sealing, the heating means substantially comprise an inductor powered by a high-frequency current generator and substantially comprising one or more inductor bars made of electrically conductive material, extending parallel to the second direction, and which interact with the tube material to induce a loss current in it and heat it to the necessary sealing temperature.

The other jaw, known as the counter-jaw, on the other hand, is fitted with pressure pads made of elastomeric material, and which cooperate with the inductor bars to heat seal the tube along a relative transverse sealing band.

Sealing jaw sealing devices comprising inductors of the above type are known.

More specifically, known sealing devices substantially comprise a plastic supporting body connected integrally to the sealing jaw and defining two front seats for housing respective inductor bars; and an insert made of magnetic flux-concentrating material—in particular, a composite material comprising ferrite—and housed inside the supporting body, close to the inductor bars.

More specifically, the plastic supporting body cooperates with the insert, and defines a peripheral portion of the sealing device surrounding the inductor bars and the insert of magnetic flux-concentrating material.

Such known sealing devices are e.g. known from the patent documents EP 1 270 182 and EP 2 008 795.

The Applicant has observed that, due to the mechanical loads to which it is subjected in use, the plastic supporting body is susceptible to cracking, which reduces the working life of the sealing device and limits use of the device on high-speed packaging units.

A further problem with transversal inductors is that sealing quality requirements on the packages are not always met due to occasional integrity issues when sealing over the fin crease and stops of the machine due to swinging of the packages coming from PE extrusion in the cutting line.

Finally, known transversal inductors have a high cost due to a complex manufacturing and the use of expensive materials.

There is thus a need for a transversal inductor which has a simpler design, is easier to manufacture and use cheaper materials, has an improved mechanical strength and lifetime, while maintaining or improving functionalities of the transversal inductor.

SUMMARY OF THE INVENTION

It is an object of the present invention to improve the current state of the art, to solve problems of the prior art, and to provide an improved induction sealing device for heat sealing packaging material for producing sealed packages of pourable food products that is simpler, cheaper, and more robust.

These and other objects are achieved by an induction sealing device for heat sealing packaging material for producing sealed packages of pourable food products, said sealing device comprising: an inductor device which interact with said packaging material by means of at least one active surface; a flux-concentrating insert; and a supporting body comprising heat-conducting material and housing said inductor device and said flux-concentrating insert; wherein said flux concentrating insert comprises a magnetic compound of a polymer and soft magnetic particles; and said flux concentrating insert interact with said packaging material via at least one interactive surface.

By using an insert that has direct contact with the package material via the interactive surface the plastic parts formerly used for forming the contacting parts of the sealing device in the prior art, apart from the active surfaces of the inductor device, are not necessary. The inductor device will then be more robust, have fewer parts and the parts are also cheaper.

The polymer may be a plastic matrix as PA: polyimide, various grades like PA6 and PA9, wherein some are resistant to temperature, or PPS: Polyphenylene sulphide.

According to a further aspect of the present invention the supporting body of the induction sealing device is housing said inductor device in at least one cavity, wherein said at least one cavity is adapted and shaped as a mould for viscous non-cured magnetic compound so that said flux-concentrating insert may be moulded directly into said supporting body surrounding said inductor device in a flux concentrating fashion without covering said at least one active surface. Since the flux concentration insert, the core in a traditional inductor, is moulded directly onto the supporting body, the manufacturing is simplified. The soft magnetic particles may be ferrite, NiZn ferrite, FeSiAl (sendust), nanocrystaline alloys as FeSiB and its derivatives or FeNi-alloys and its derivatives. The magnetic compound is preferably electrically insulating, achieved by means of the polymer binding material. Having a flux concentrating insert that is electrically insulating in itself makes any other insulating material between the flux concentrating insert and the inductor device unnecessary.

According to a still further aspect of the present invention, the magnetic compound is reinforced with a fiber structure so as to enhance its mechanical strength. The fiber structure could be any one compatible with a polymer binder, as e.g. glass fiber, kevlar etc.

According to a still further aspect of the present invention the cavity of the supporting body contains at least one circumferential recess adapted to lock a moulded flux concentrating insert in said cavity. The magnetic compound will fill out the groove so that, when the magnetic compound has cured, the flux concentrating insert will be locked by wings engaging and filling out said grooves.

The induction sealing device is advantageous used as a transversal induction sealing device e.g. for sealing package material containing aluminum foil.

The induction sealing device may further have a supporting body made of stainless steel, which is a suitable non-corrosive material with a high thermal conductivity and being suitable for using as a mould.

The transversal induction sealing device may further comprise a central cutting groove for extending along a central transversal axis and an axis normal to the at least one active surface, said inductor device being placed on both sides of said cutting groove. The cutting groove placed in between the inductor device so that a package material may be sealed at two places and cut between the seals, a common technique used in tube filling machines for liquid food. A second part of the mould may during moulding be placed where the cutting groove is intended to be, creating the groove when the second part of the mould is removed.

According to one aspect of the present invention, the cutting groove is formed in said supporting body so that cavities are formed on each side of said groove. The supporting body, and not the flux-concentrating insert, thus forms said cutting groove, creating a more stable cutting groove than if it would be made by the moulded flux-concentrating insert. Also, the secondary parts of the mould will not be necessary.

According to a further aspect of the present invention the cavity has an opening cross sectional area that is smaller than a second cross sectional area in the cavity, wherein said opening cross sectional area is parallel to said second cross sectional area. Using an entry to the cavity that is smaller than inner parts of the cavity ensures that the flux-concentrating insert, when moulded to its place, cannot move out from the cavity when used in a sealing process. Since the pressure may be very high between the interactive surface and the packing material when the sealing device is used in production it is important that the sealing device is robust.

The inductor device may further have at least one recess extending at least in a direction parallel to said interacting surface for locking said inductor device in said flux-concentrating insert when the sealing device is used. In that way it is ensured that the inductor device do not pop out from the moulded flux-concentrating insert. A way to avoid rotation of the moulded flux-concentrating insert is to shape cavity to have an irregular shape, e.g. a flat bottom side.

It should be noted that the inventive method may incorporate any of the features described above in association of the inventive device and has the same corresponding advantages.

DESCRIPTION OF THE DRAWINGS

In the following the present invention will be described in greater detail together with the accompanying drawings, in which.

DETAILED DESCRIPTION

Figure 1:
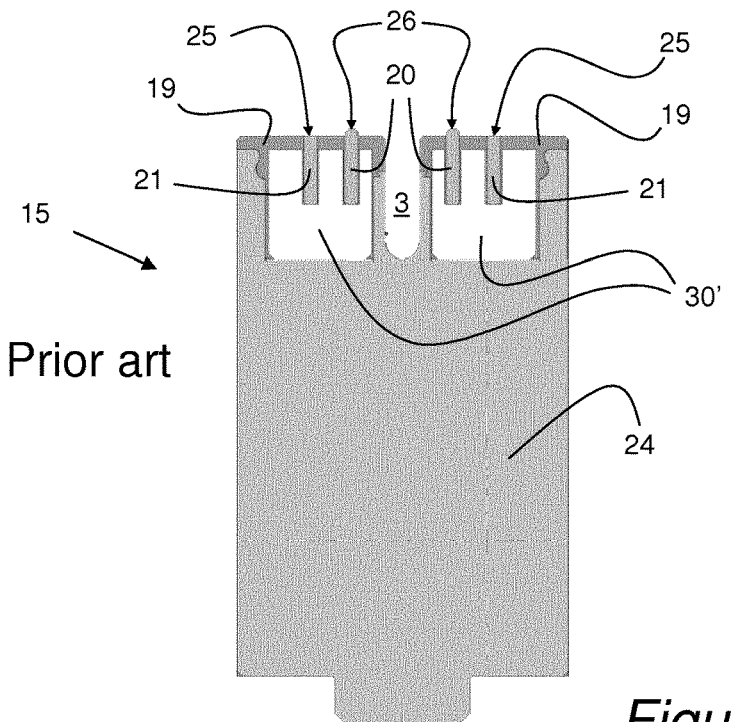
FIG. 1 is cross sectional view of a transversal sealing device according to the prior art.

FIG. 1 is a cross sectional drawing of a transversal induction sealing device 15 according to the prior art. A supporting body 24 is housing a flux-concentrating insert 30' which flux-concentrating insert 30' houses inductor device 20, 21. The inductor device have active surfaces 25, 26 adapted to be pressed against a packing material surface (not shown) to induce current and thereby heat in a metal layer of the packing material during a sealing process. The inductor device 20, 21 and the flux-concentrating insert 30' are locked to the supporting body by a moulded plastic member 19. The plastic member 19 will also have an outer surface that will be pressed against the packing material during a sealing operation. High pressures are exerted on the sealing device when in use, which will wear substantially on the, compared to the dimensions of the induction device, relatively thin plastic member. The result is that the plastic member often will crack, reducing the lifetime of the induction device.

Figure 2:
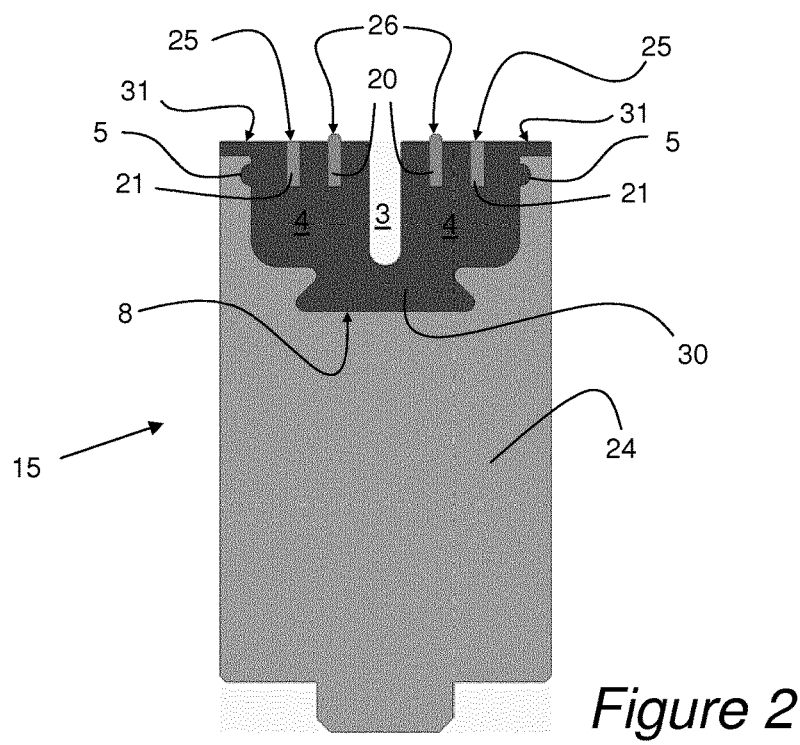
FIG. 2 is a cross sectional view of a transversal sealing device according to a first embodiment of the present invention.

FIG. 2 shows a cross sectional view of a transversal induction device 19 according to the present invention. A supporting body 24 has a cavity 4, in which cavity 4 inductor device 20, 21 are positioned. In the cavity 4 a flux-concentrating insert 30 is moulded around the inductions means 20, 21, without covering the active surfaces 25, 26 of the inductor device. The flux-concentrating insert has an interacting surface 31 that is in level with the active surface 25 of the inductor device 20, 21. The cavity has a circumferential recess 5 along a side wall for locking the moulded flux-concentrating insert 30 in the cavity. The flux-concentrating insert 30 is moulded by a magnetic compound of a polymer and soft magnetic particles (not shown), the polymer being made by polyamideor polyphenylene sulphide and the magnetic particles being ferrite, NiZn ferrite, FeSiAl, FeSiB or FeNi-alloys. Ni Zn ferrite is preferred. The moulded material may also be reinforced by e.g. glass fiber (not shown). A cutting groove 3 is formed in the flux-concentrating insert 30 to allow a packing material to be cut simultaneously with the sealing of a packing material on either side of the cutting groove 30. The cutting groove is formed during the moulding of the flux-concentrating insert by using a second part of the mould (not shown) placed in the volume that forms the cutting groove 3.

Figure 3:
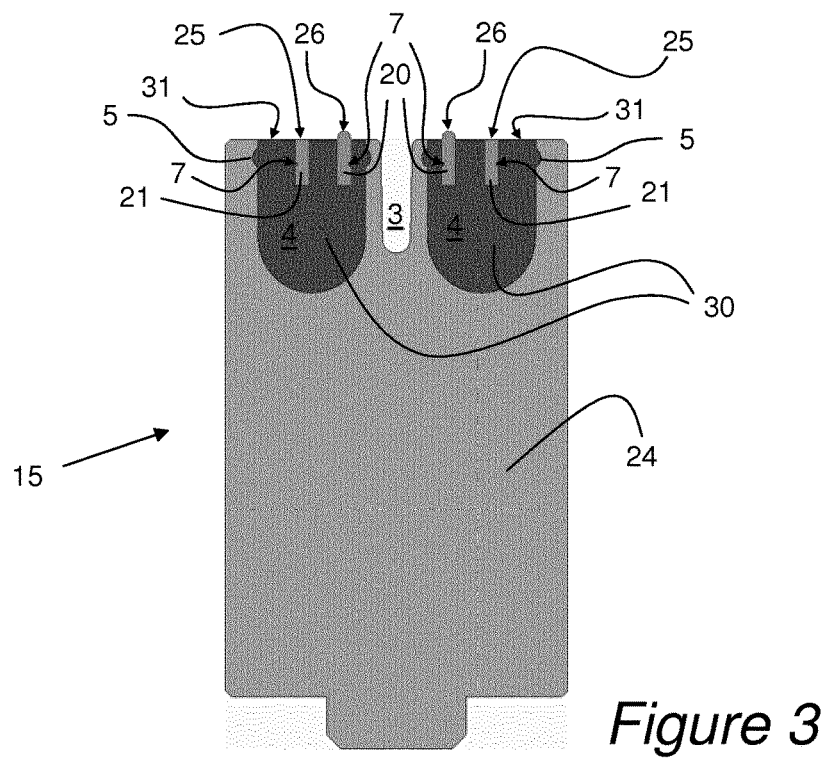
FIG. 3 is a cross sectional view of a transversal sealing device according to a second embodiment of the present invention.

FIG. 3 shows a cross sectional view of a transversal induction device 19 according to a second embodiment of the present invention. A supporting body 24 has two cavities 4, in which cavities 4 inductor device 20, 21 are positioned. In each cavity 4 a flux-concentrating insert 30 is moulded around the respective inductions means 20, 21, without covering the active surfaces 25, 26 of the respective inductor device. The flux-concentrating insert has an interacting surface 31 that is in level with the active surface 25 of the inductor device 20, 21. Each cavity has a circumferential recess 5 along a side wall for locking the moulded flux-concentrating insert 30 in the cavity. The flux-concentrating insert 30 is moulded by a magnetic compound of a polymer and soft magnetic particles. A cutting groove 3 is formed in the supporting body 24 between the two cavities 4 to allow a packing material to be cut simultaneously with the sealing of a packing material on either side of the cutting groove 30. Each of the inductor device have a recess 7 for locking each inductor device to the respective moulded flux-concentrating insert 30.

Figure 4A:
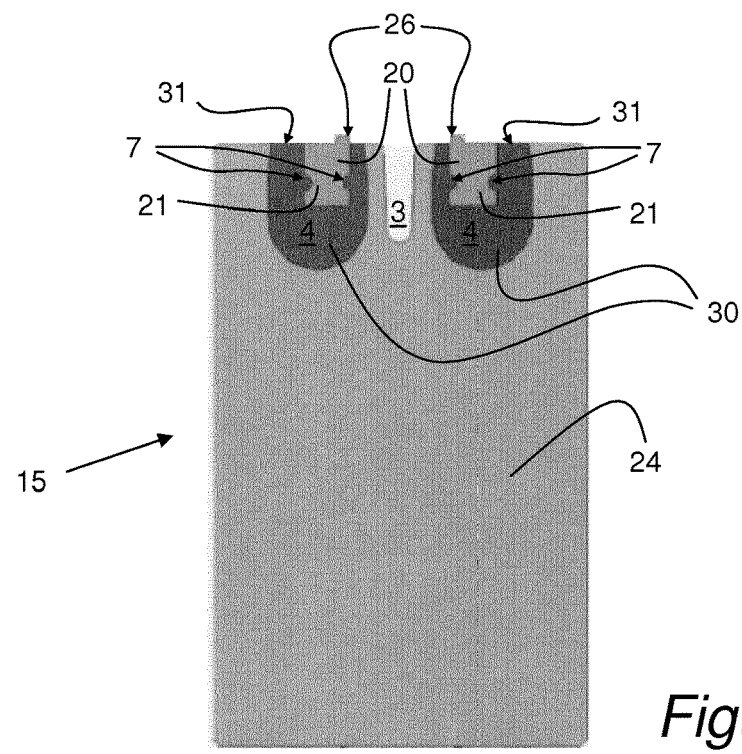
FIG. 4a-4c are cross sectional views of a transversal sealing device according to a third, fourth and fifth embodiment of the present invention.

FIG. 4a shows a cross sectional view of a transversal induction device 19 according to a third embodiment of the present invention. A supporting body 24 has two cavities 4, in which cavities 4 inductor device 20, 21 are positioned. In each cavity 4 a flux-concentrating insert 30 is moulded around the respective inductions means 20, without covering the active surfaces 26 of the respective inductor device. The flux-concentrating insert has an interacting surface 31 that is in level with the lower part of the active surface 25 of the inductor device 20. The flux-concentrating insert 30 is moulded by a magnetic compound of a polymer and soft magnetic particles. A cutting groove 3 is formed in the supporting body 24 between the two cavities 4 to allow a packing material to be cut simultaneously with the sealing of a packing material on either side of the cutting groove 30. Each of the inductor device have two recesses 7 for locking each inductor device to the respective moulded flux-concentrating insert 30. The opening cross section surface of each cavity 4 is smaller than the cross section surface further down in each cavity, locking the moulded flux-concentrating inserts 30 in the cavities 4.

Figure 4B:
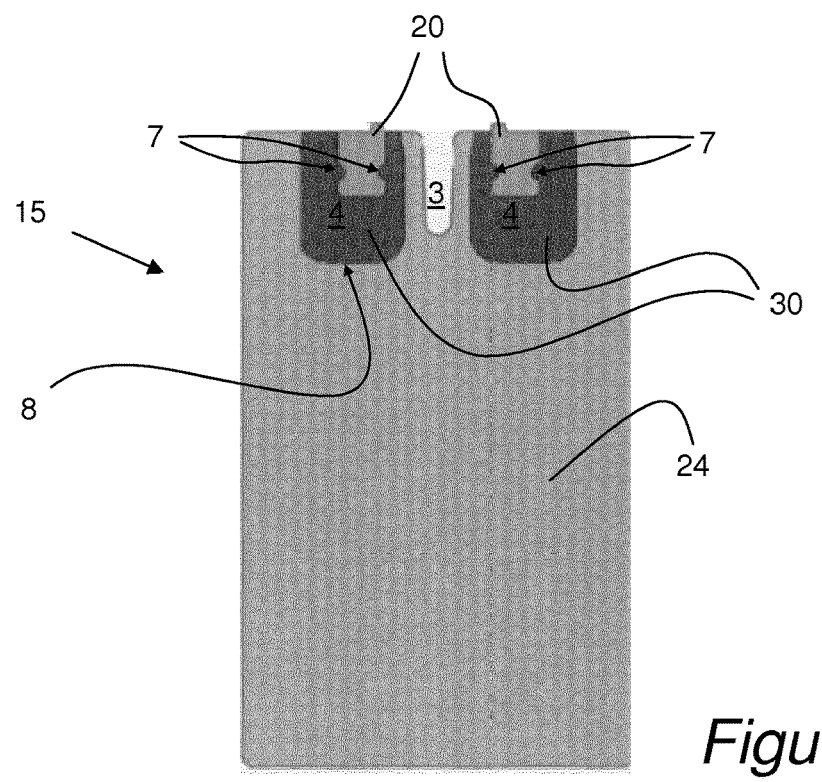

FIG. 4b shows a cross sectional view of a transversal induction device 19 according to a fourth embodiment of the present invention, very similar to the third embodiment shown in FIG. 4a. In the fourth embodiment, the cavity has a flat bottom 8 to reduce tendencies of rotation of the moulded flux-concentrating insert 30.

Figure 4C:
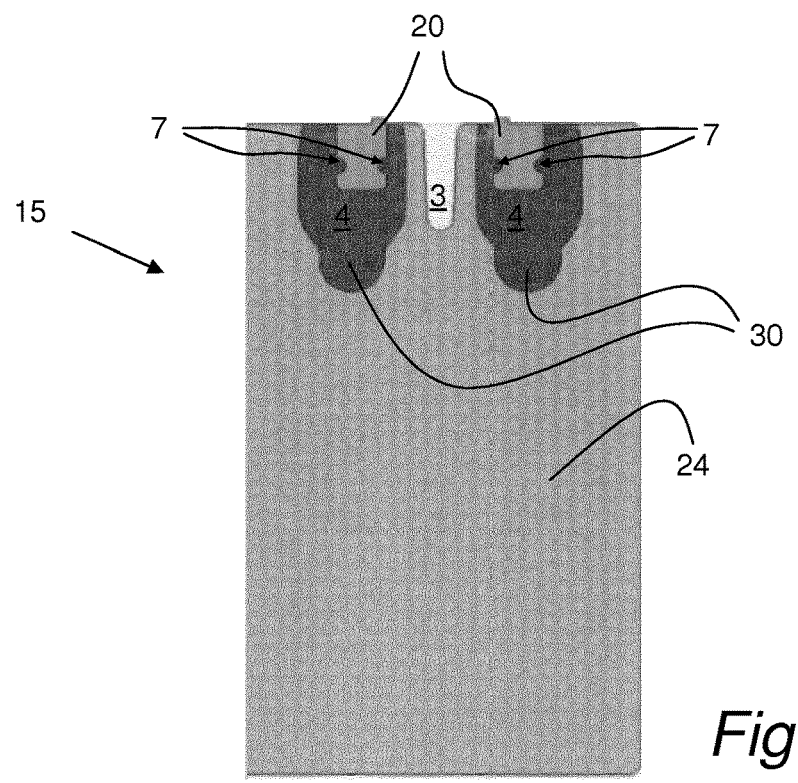

FIG. 4c shows a cross sectional view of a transversal induction device 19 according to a fifth embodiment of the present invention, very similar to the third and fourth embodiments shown in FIG. 4a and FIG. 4b. In the fourth embodiment, the cavity has a more complex shape to reduce tendencies of rotation of the moulded flux-concentrating insert 30 and to optimize the flux-concentration.

Figure 5:
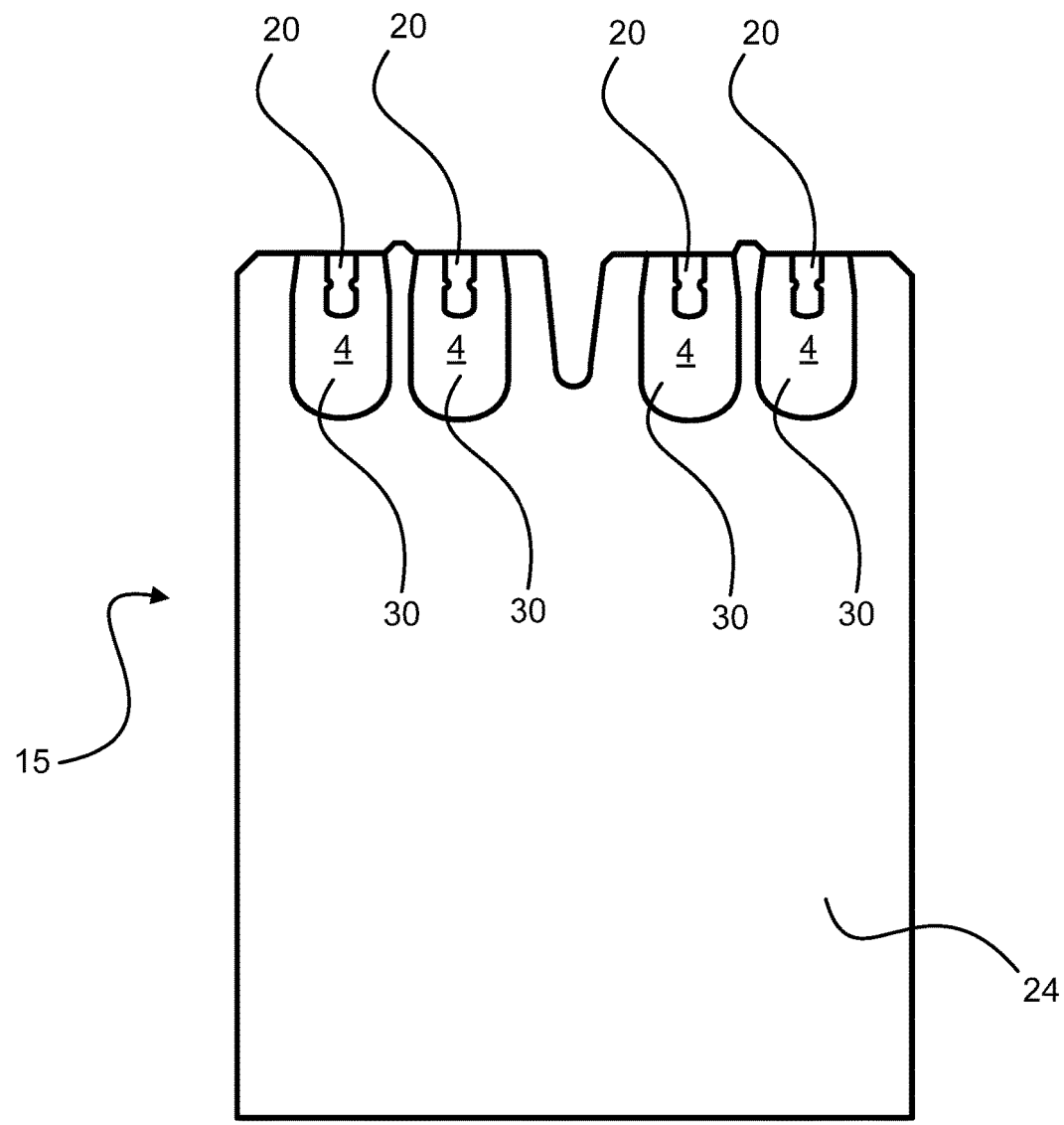
FIG. 5 is a cross sectional view of a transversal sealing device according to a sixth embodiment of the present invention.

FIG. 5 shows a cross sectional view of a transversal induction device 19 according to a sixth embodiment of the present invention. In this embodiment four cavities 4 are used. In each cavity 4 a flux-concentrating insert 30 is moulded around the respective inductions means 20. This embodiment is an example of how a so-called twin loop inductor can be combined with the present invention.

It is understood that other variations in the present invention are contemplated and in some instances, some features of the invention may be employed without a corresponding use of other features. Accordingly, it is appropriate that the appended claims be construed broadly in a manner consistent with the scope of the invention.

The invention claimed is:

1. An induction sealing device for heat sealing packaging material for producing sealed packages of pourable food products, said sealing device comprising:
   a plurality of inductors, each inductor including first and second active surfaces configured to interact with said packaging material, said second active surface of each inductor protruding above the first active surface;
   at least one flux-concentrating insert; and
   a supporting body made at least partially of heat-conducting material and comprising at least one cavity housing said at least one flux-concentrating insert, said plurality of inductors positioned in said at least one cavity and surrounded by said flux-concentrating insert without covering said first and second active surfaces of the plurality of inductors, said at least cavity including at least one first recess configured to lock said at least one flux-concentrating insert in said at least one cavity,
   wherein each inductor includes at least one second recess configured to lock said inductor in said at least one flux-concentrating insert,
   wherein said at least one flux-concentrating insert comprises a magnetic compound of a polymer and soft magnetic particles, and
   wherein said at least one flux-concentrating insert is configured to interact with said packaging material via at least one interactive surface that is level with the first active surface of each inductor.

2. The induction sealing device according to claim 1, wherein said induction sealing device is a transversal induction sealing device.

3. The induction sealing device according to claim 1, wherein said supporting body is made of stainless steel.

4. The induction sealing device according to claim 2, further comprising a central cutting groove extending along a central transversal axis of said supporting body and an axis normal to the at least one active surface, wherein said plurality of inductors comprises two inductors positioned on both sides of said cutting groove, and wherein said cutting groove is configured to permit said packaging material to be cut.

5. The induction sealing device according to claim 1, wherein said at least one cavity is adapted and shaped as a mould for viscous non-cured magnetic compound and, wherein said at least one flux-concentrating insert is moulded directly into said at least one cavity of said supporting body.

6. The induction sealing device according to claim 1, wherein said soft magnetic particles are selected from the group consisting of:
ferrite, NiZn ferrite, FeSiAl, FeSiB and FeNi-alloys.

7. The induction sealing device according to claim 1, wherein said magnetic compound is electrically insulating.

8. The induction sealing device according to claim 1, wherein said magnetic compound is reinforced with a fiber structure so as to enhance its mechanical strength.

9. The induction sealing device according to claim 1, wherein said at least one first recess comprises a circumferential recess along a side wall of said at least one cavity.

10. The induction sealing device according to claim 4, wherein said cutting groove is formed in said supporting body, and wherein a plurality of cavities are formed on each side of said cutting groove.

11. The induction sealing device according to claim 1, wherein said at least one cavity includes an opening in which said at least one interactive surface of said at least one flux-concentrating insert is located, wherein said opening has a cross sectional area that is smaller than a second cross sectional area in the at least one cavity positioned distal from said opening, and wherein said opening cross sectional area is parallel to said second cross sectional area.

12. The induction sealing device according to claim 1, wherein said at least one second recess of each inductor extends at least in a direction parallel to said at least one interactive surface of said flux-concentrating insert.

13. The induction sealing device according to claim 1, wherein said at least one cavity includes a flat bottom side that prevents rotation of said at least one flux-concentrating insert.

14. The induction sealing device according to claim 1, wherein said at least one flux-concentrating insert comprises two flux-concentrating inserts, and wherein said at least one cavity comprises two cavities each housing a flux-concentrating insert.

15. An induction sealing device for heat sealing packaging material for producing sealed packages of pourable food products, said sealing device comprising:
a housing made at least partially of heat-conducting material and comprising a plurality of cavities;
a plurality of flux-concentrating inserts each positioned in a respective cavity of said plurality of cavities in said housing and locked in said cavity with a first recess of said cavity, each flux-concentrating insert comprising a magnetic compound of a polymer and soft magnetic particles, and each flux-concentrating insert configured to interact with said packaging material via at least one interactive surface; and
a plurality of inductors each including first and second active surfaces configured to interact with said packaging material and a second recess, said second active surface of each inductor protruding above the first active surface, each inductor positioned in a respective cavity of said plurality of cavities, surrounded in said cavity by a flux-concentrating insert of said plurality of flux-concentrating inserts without covering said first and second active surfaces, and locked in said flux-concentrating insert with the second recess.

16. The induction sealing device according to claim 15, further comprising a cutting groove formed in said housing and extending along a central transversal axis of said housing, said cutting groove configured to permit said packaging material to be cut, wherein at least two cavities of said plurality of cavities are positioned on both sides of said cutting groove, and wherein at least two inductors of said plurality of inductors are positioned in said at least two cavities.

17. The induction sealing device according to claim 15, wherein said first recess includes at least one circumferential recess along a side wall of said cavity.

18. The induction sealing device according to claim 15, wherein said second recess extends in a direction parallel to said at least one interactive surface of a flux-concentrating insert surrounding said inductor.

19. The induction sealing device according to claim 15, wherein at least one of said plurality of cavities includes a flat bottom side that prevents rotation of a flux-concentrating insert of said plurality of flux-concentrating inserts positioned in said cavity.

20. The induction sealing device according to claim 15, wherein at least one of said plurality of cavities includes an opening in which said at least one interactive surface of a flux-concentrating insert of said plurality of flux-concentrating inserts is located, wherein said opening has a cross sectional area that is smaller than a second cross sectional area of a portion of said cavity distal from said opening, and wherein said opening cross sectional area is parallel to said second cross sectional area.

21. The induction sealing device according to claim 15, wherein said soft magnetic particles of said plurality of flux-concentrating inserts are selected from the group consisting of ferrite, NiZn ferrite, FeSiAl, FeSiB and FeNi-alloys.

22. The induction sealing device according to claim 15, wherein said at least one interactive surface of each flux-concentrating insert of said plurality of flux-concentrating inserts is level with the first active surface of at least one inductor that is surrounded by said flux-concentrating insert.

* * * * *

UNITED STATES PATENT AND TRADEMARK OFFICE
CERTIFICATE OF CORRECTION

PATENT NO. : 10,350,832 B2  
APPLICATION NO. : 15/529340  
DATED : July 16, 2019  
INVENTOR(S) : Per Karlsson Page 1 of 1

It is certified that error appears in the above-identified patent and that said Letters Patent is hereby corrected as shown below:

In the Specification

Column 3, Line 7, delete "polyimide," and insert --polyamide,--.

In the Claims

Column 7, Line 36, Claim 14, delete "scaling" and insert --sealing--.

Column 8, Line 5, Claim 15, after "a" delete "respective".

Signed and Sealed this
Twenty-ninth Day of October, 2019

Andrei Iancu
*Director of the United States Patent and Trademark Office*